United States Patent
Kwon (10) Patent No.: US 8,045,059 B2
(45) Date of Patent: Oct. 25, 2011

(54) GAIN CONTROL CIRCUIT AND METHOD OF CONTROLLING GAIN

(75) Inventor: Jin-Ho Kwon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1296 days.

(21) Appl. No.: 11/672,122

(22) Filed: Feb. 7, 2007

(65) Prior Publication Data

US 2007/0182860 A1    Aug. 9, 2007

(30) Foreign Application Priority Data

Feb. 8, 2006    (KR) ........................ 10-2006-0011914

(51) Int. Cl.
*H04N 5/52* (2006.01)

(52) U.S. Cl. ...................................................... 348/572

(58) Field of Classification Search .................. 348/672, 348/678, 679, 687, 689, 663, 66, 668; 375/362; 386/112, 114

See application file for complete search history.

(56) References Cited

U.S. PATENT DOCUMENTS

| | | | | |
|---|---|---|---|---|
| 4,928,692 A | * | 5/1990 | Goodman et al. | 600/324 |
| 5,053,983 A | * | 10/1991 | Hyatt | 708/306 |
| 6,104,331 A | * | 8/2000 | Ishida et al. | 341/155 |
| 6,628,222 B2 | | 9/2003 | Go | |
| 7,391,962 B2 | * | 6/2008 | Jeon | 386/328 |
| 7,634,034 B2 | * | 12/2009 | Larsson | 375/362 |

FOREIGN PATENT DOCUMENTS

| | | |
|---|---|---|
| JP | 11-261921 | 9/1999 |
| JP | 2005-236726 | 9/2005 |

* cited by examiner

*Primary Examiner* — Paulos Natnael
(74) *Attorney, Agent, or Firm* — F. Chau & Associates, LLC (57) ABSTRACT

A gain control circuit includes an automatic gain controller (AGC), an analog-to-digital converter (ADC), a saturation field detecting block, a sync detector and a gain control block. The AGC controls amplitude of an analog image signal including a luminance signal, a color signal and a sync signal. The ADC converts the amplitude-controlled analog image signal to a digital image signal. The saturation field detecting block determines on a per field basis whether the digital image signal is saturated. The sync detector is configured to detect the sync signal in the digital image signal. The gain control block provides a gain control signal to the AGC based on an output signal of the saturation field detecting block and an output signal of the sync detector. Therefore, the gain control circuit may prevent saturation of the analog image signal by controlling gain of the analog image signal.

22 Claims, 7 Drawing Sheets

FIG. 2A

ANALOG IMAGE SIGNAL

FIG. 2B

DIGITAL IMAGE SIGNAL

GAIN CONTROL CIRCUIT AND METHOD OF CONTROLLING GAIN

CROSS-REFERENCE TO RELATED APPLICATION

This application claims priority under 35 USC §119 to Korean Patent Application No. 2006-11914, filed on Feb. 8, 2006 in the Korean Intellectual Property Office (KIPO), the disclosure of which is incorporated herein in its entirety by reference.

BACKGROUND OF THE INVENTION

1. Technical Field

The present disclosure relates to a gain control circuit, and more particularly to a gain control circuit for preventing saturation of an image signal.

2. Discussion of Related Art

An analog image signal includes a luminance signal, a color signal and a sync signal. A digital television set includes an automatic gain control (AGC) circuit for obtaining a stable output when the amplitude of the analog input image signal varies.

Image signals constituting a picture of the digital television set are referred to as being comprised of fields, and each field includes signals corresponding to a plurality of scan lines. In the conventional television art, a gain of the analog image signal is controlled by detecting a position of the sync signal in every scan line constituting one field. Thus, a saturation of the image signal occurs frequently.

SUMMARY OF THE INVENTION

Accordingly, exemplary embodiments of the present invention are provided to substantially obviate one or more problems due to limitations and disadvantages of the related art.

Exemplary embodiments of the present invention provide a gain control circuit that may prevent saturation of an analog image signal.

Exemplary embodiments of the present invention provide a method of controlling gain that may prevent saturation of an analog image signal.

In exemplary embodiments of the present invention, a gain control circuit includes an automatic gain controller (AGC), an analog-to-digital converter (ADC), a saturation field detecting block, a sync detector and a gain control block.

The AGC controls the amplitude of an analog image signal that includes a luminance signal, a color signal, and a sync signal. The ADC converts the amplitude-controlled analog image signal to a digital image signal. The saturation field detecting block determines on a per field basis whether the digital image signal is saturated. The sync detector is configured to detect the sync signal contained in the digital image signal. The gain control block provides a gain control signal to the AGC based on an output signal of the saturation field detecting block and an output signal of the sync detector.

The gain control circuit may further include a direct current (CD) clamp that fixes a DC component of the analog image signal and a low-pass filter (LPF) that filters the color signal to pass the luminance signal and the sync signal in the digital image signal.

In exemplary embodiments of the present invention, the saturation field detecting block may include a saturation pixel counting block that counts saturated pixels per scan line, a saturation line decision block that determines whether each scan line is saturated based on the number of the saturated pixels that is counted per scan line, a saturation line counting block configured to count the number of the saturated scan lines per field, and a saturation field decision block that determines whether each field is saturated based on the number of the saturated scan lines that is counted per field.

The saturation pixel counting block may determine that a pixel is a saturated pixel when a digital code of the pixel exceeds a first reference value. The first reference value may be set to a value ranging from about 80% to about 90% of a maximum digital code.

In exemplary embodiments of the present invention, the saturation line decision block may determine that a scan line is a saturated scan line when a total number of the saturated pixels in the scan line exceeds a second reference value. The second reference value may be set to a value ranging from about 25% to about 30% of a number of pixels constituting one scan line.

Exemplary embodiments of the present invention provide a saturation field decision block that determines a field as a saturated field when a total number of the saturated scan lines in the field exceeds a third reference value. The third reference value may be set to a value ranging from about 25% to about 30% of a total number of the scan lines constituting one field.

In exemplary embodiments of the present invention, the gain control block may provide the gain control signal for reducing the amplitude of the analog image signal fed to the AGC when the saturation field is detected, and the gain control block may provide the gain control signal for controlling the amplitude of the analog image signal based on the output signal of the sync detector to the AGC when a saturation field is not detected.

Exemplary embodiments of the present invention provide a method of controlling gain that includes controlling amplitude of an analog image signal including a luminance signal, a color signal and a sync signal, converting the amplitude-controlled analog image signal to a digital image signal, determining on a per field basis whether the digital image signal is saturated, detecting the sync signal in the digital image signal and providing a gain control signal that controls the amplitude of the analog image signal based on the detected sync signal and the saturated field that is determined.

The method of controlling gain may further include fixing a DC component of the analog image signal and filtering the color signal to pass the luminance signal and the sync signal in the digital image signal.

In exemplary embodiments of the present invention, determining on a per field basis whether the digital image signal is saturated may include counting the number of saturated pixels per scan line, determining whether each scan line is saturated based on the number of the saturated pixels that is counted per scan line, counting the number of the saturated scan lines per field, and determining whether each field is saturated based on the number of the saturated scan lines that is counted per field.

In exemplary embodiments of the present invention, counting the number of the saturated pixels may include receiving the digital image signal including the luminance signal and the sync signal, determining that a pixel is a saturated pixel when a digital code of the pixel exceeds a first reference value and counting per scan line the saturated pixels having a digital code exceeding the first reference value. The first reference value may be set to a value ranging from about 80% to about 90% of a maximum digital code. The number of the saturated pixels may increase by one whenever the digital code of the pixels exceeds the first reference value.

In exemplary embodiments of the present invention, determining whether each scan line is saturated may include receiving the number of saturated pixels that is counted, comparing the number of the saturated pixels with a second reference value, and determining that a scan line is a saturated scan line when a total number of saturated pixels in the scan line exceeds the second reference value. The second reference value may be set to a value ranging from about 25% to about 30% of a number of pixels constituting one scan line. The number of saturated scan lines may increase by one whenever the number of saturated pixels in one scan line exceeds the second reference value.

In exemplary embodiments of the present invention, determining whether each field is saturated may include receiving the number of saturated scan lines in one field, comparing the number of saturated scan lines with a third reference value and determining that a field is a saturated field when a total number of saturated scan lines in the field exceeds the third reference value. The third reference value may be set to a value ranging from about 25% to about 30% of a total number of the scan lines constituting one field. The third reference value may correspond to 80 in the case of the NTSC interlaced scan method and corresponds to 160 in the case of the progressive scan method.

Exemplary embodiments of the present invention may control the amplitude of the analog image signal based on the detected sync signal when the saturated field is not detected.

Exemplary embodiments of the present invention may reduce the amplitude of the analog image signal when the saturated field is detected.

Therefore, the gain control circuit and the method of controlling gain in exemplary embodiments of the present invention determine on a per field basis whether a field is saturated, and may prevent saturation of the analog image signal to prevent loss of image information by controlling the gain of the analog image signal.

BRIEF DESCRIPTION OF THE DRAWINGS

Exemplary embodiments of the present invention will be understood in more detail from the following descriptions taken in conjunction with the attached drawings.

DESCRIPTION OF EXEMPLARY EMBODIMENTS

Exemplary embodiments of the present invention will be described more fully with reference to the accompanying drawings, in which exemplary embodiments of the present invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. Like reference numerals refer to like elements throughout this application.

Figure 1:
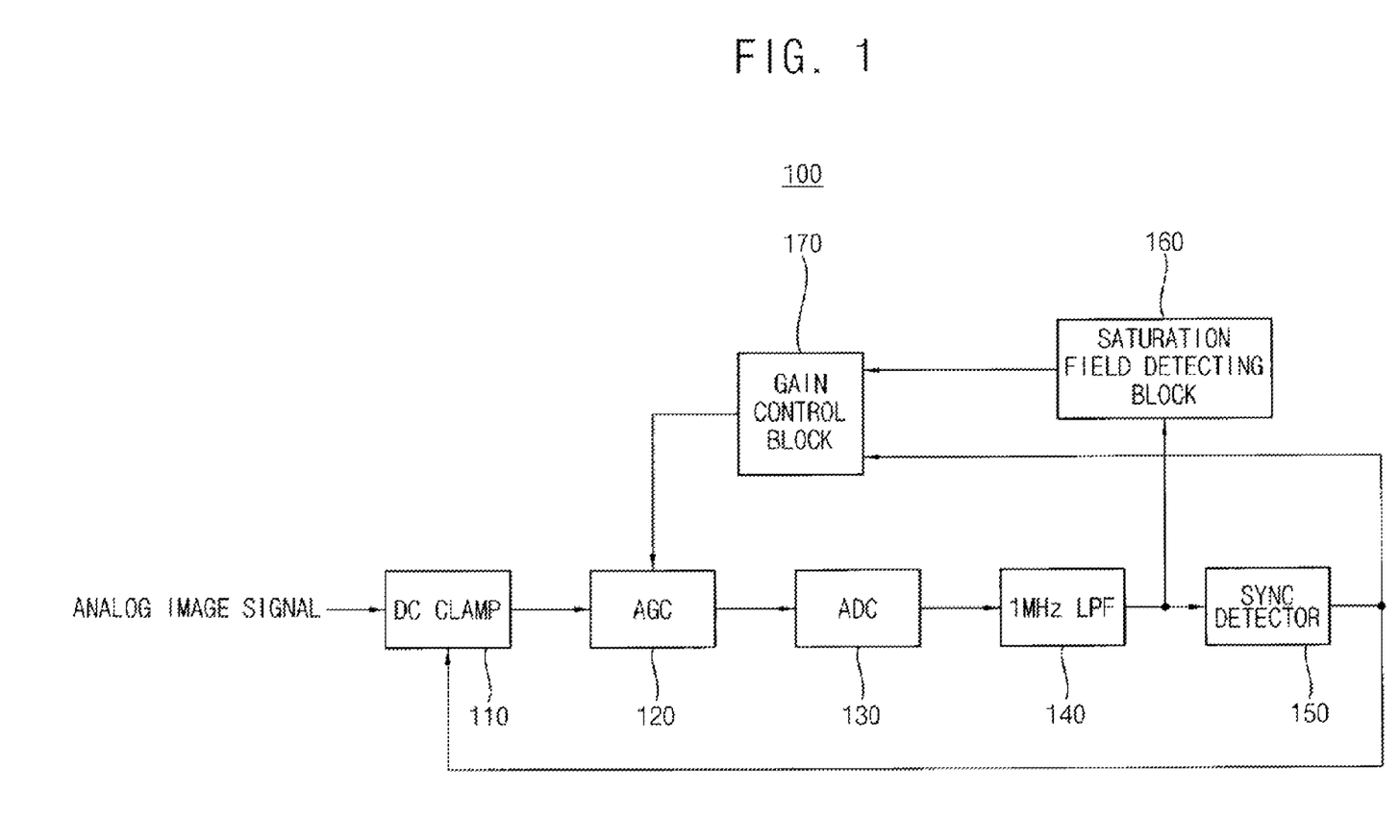
FIG. 1 is a block diagram illustrating the structure of a gain control circuit according to an exemplary embodiment of the present invention.

FIG. 1 is a block diagram illustrating the structure of a gain control circuit according to an exemplary embodiment of the present invention.

Referring to FIG. 1, the gain control circuit 100 includes an automatic gain controller (AGC) 120, an analog-to-digital converter (ADC) 130, a saturation field detecting block 160 and a sync detector 150. The gain control circuit may further include a direct current (DC) clamp 110 and a low-pass filter (LPF) 140.

An analog image signal, for example, a composite video baseband signal may include a color signal, a luminance signal and a sync signal.

In FIG. 1, when an analog image signal is inputted, a DC component of the analog image signal is fixed at a predetermined level in the DC clamp 110. Amplitude of the DC-clamped analog image signal is controlled by the AGC 120, and the amplitude-controlled analog image signal is converted to a digital image signal by the ADC 130. In an exemplary embodiment, a digital code of the digital image signal may range from 0 to 255, when the digital image signal includes 8-bit data. The LPF 140 filters out the color signal and passes the luminance signal and the sync signal in the coded digital image signal. The coded digital image signal is inputted to the sync detector 150 and to the saturation field detecting block 160.

The sync detector 150 detects a position of the sync signal in the digital image signal. Then the sync detector 150 measures a sync tip depth and a clamp level. Information about the sync tip depth and the clamp level is provided to the DC clamp 110 and the gain control block 170. The DC component and the gain are controlled based on that information.

When the amplitude of the analog image signal is controlled by the sync detector 150, there is a problem as described below.

FIGS. 2A through 2E respectively illustrate waveforms of an input analog image signal, a digital image signal, a digital image signal free from a color signal, a digital image signal that has an abnormally small sync signal, and a saturated digital image signal.

Figure 2A:
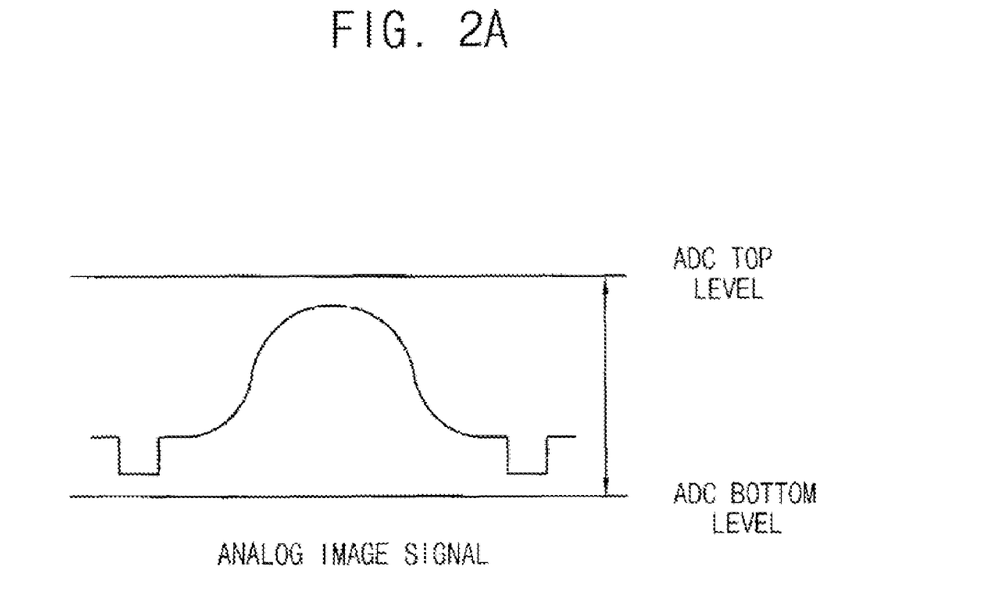
FIG. 2A is a waveform of an analog image signal inputted to the analog-to-digital controller (ADC) in FIG. 1.

FIG. 2A is a waveform of an analog image signal inputted to the ADC 130 in FIG. 1.

Figure 2B:
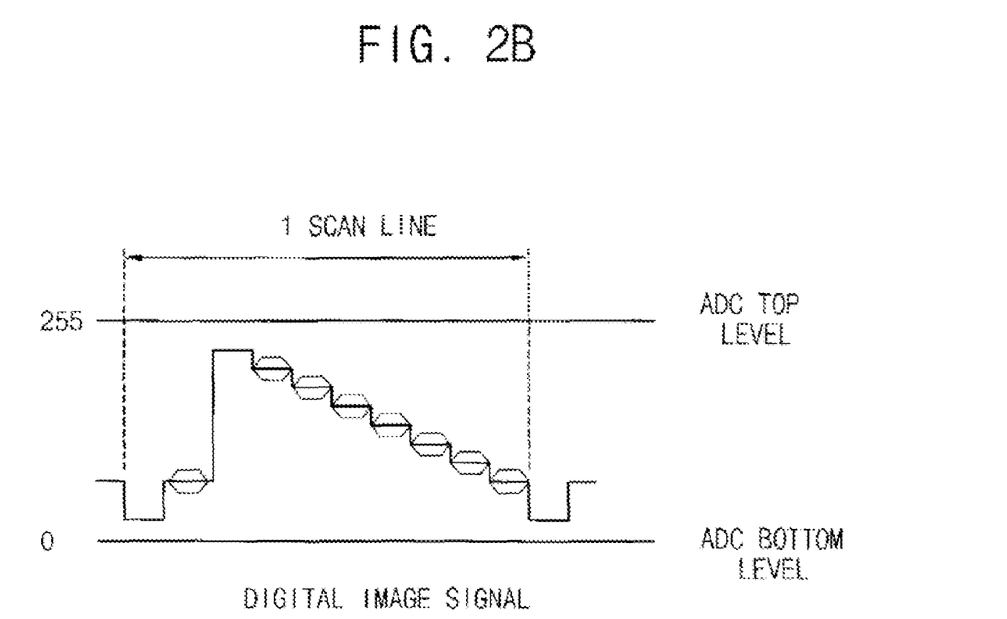
FIG. 2B is a waveform of a digital image signal that is output from the ADC in FIG. 1.

FIG. 2B is a waveform of a digital image signal that is output from the ADC in FIG. 1.

Figure 2C:
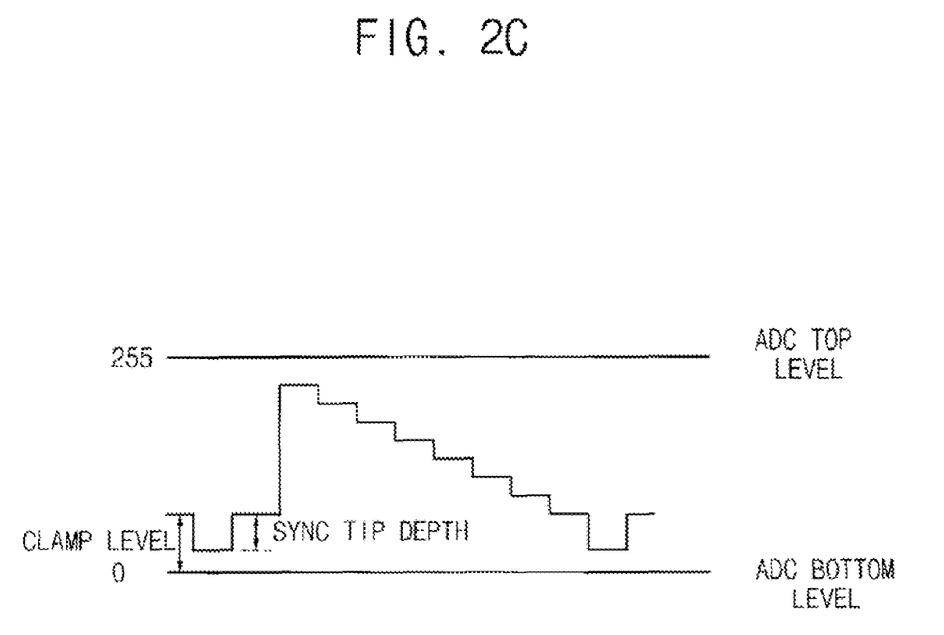
FIG. 2C is a waveform of a digital image signal that is output from the low-pass filter (LPF) in FIG. 1.

FIG. 2C is a waveform of a digital image signal that is output from the LPF 140 in FIG. 1. The digital image signal in FIG. 2C does not include the color signal.

Figure 2D:
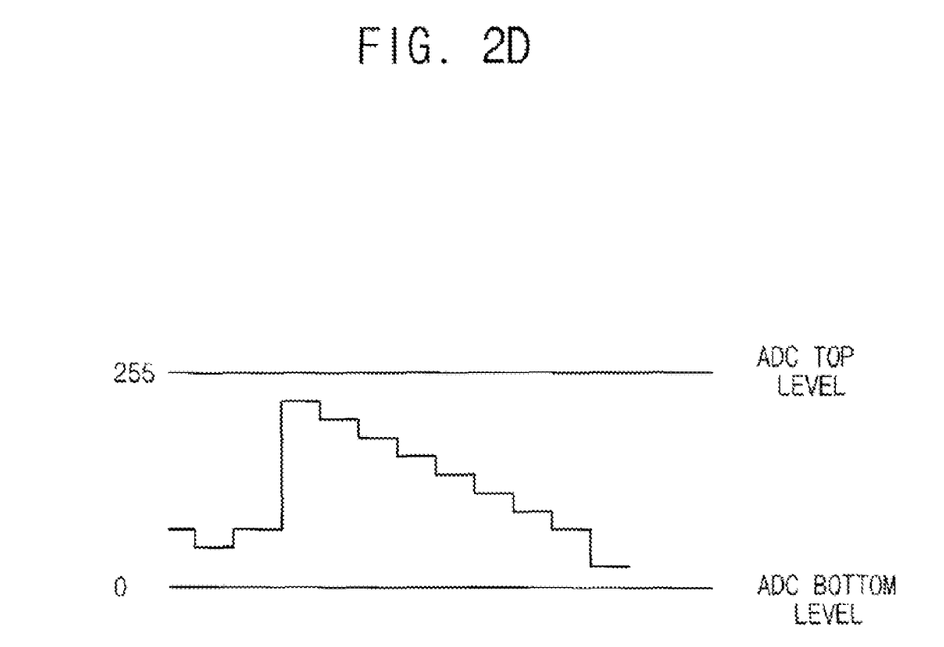
FIG. 2D is a waveform of a digital image signal that has an abnormally small sync signal, such as a cable television image signal.
Figure 2E:
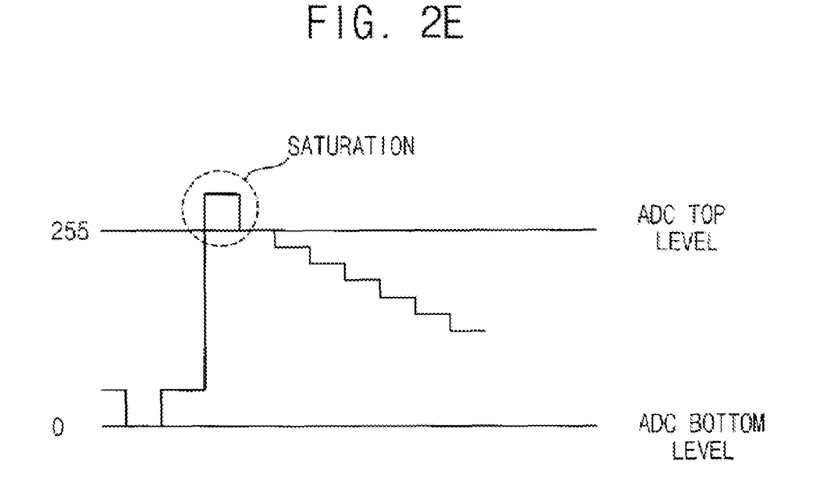
FIG. 2E is a waveform that illustrates the digital image signal of FIG. 2D, whose amplitude is controlled by the sync detector.

FIG. 2D is waveform of a digital image signal that has an abnormally small sync signal, such as a cable television image signal, and the FIG. 2E is a waveform that illustrates the digital image signal of FIG. 2D, whose amplitude is controlled by a sync detector.

Referring to FIG. 2E, the waveform of the digital image signal, whose amplitude is controlled by the sync detector 150, has some portions that exceed a top level of the ADC 140. The portions that exceed the top level of the ADC 140 cause saturation of the analog input signal. Information of the saturated portions of the analog image signal is lost without being displayed on the television. The reason for the loss of information of the image signal is that the sync detector 150 detects the sync signal of the digital image signal in every scan line to provide a signal based on the sync signal to the gain control block 170.

More specifically, as illustrated in FIG. 2C, the sync detector 150 detects a position of the sync signal in every scan line, and compares a magnitude of a sync tip depth with a magnitude of a clamp level. When the magnitude of the sync tip depth is smaller than the magnitude of the clamp level, the synch detector 150 causes the gain control block 170 to provide a gain control signal for increasing the amplitude of the analog image signal to the AGC 120. When the magnitude of the sync signal is abnormally small as illustrated in FIG. 2D, saturation may occur as illustrated in FIG. 2E. When the amplitude of the signal of FIG. 2D is increased, saturated portions occur as illustrated in FIG. 2E.

Unlike the sync detector 150, the saturation field detecting block 160 determines on a per field basis whether a field is saturated and provides an output signal based on the determination to the gain control block 170.

Figure 3:
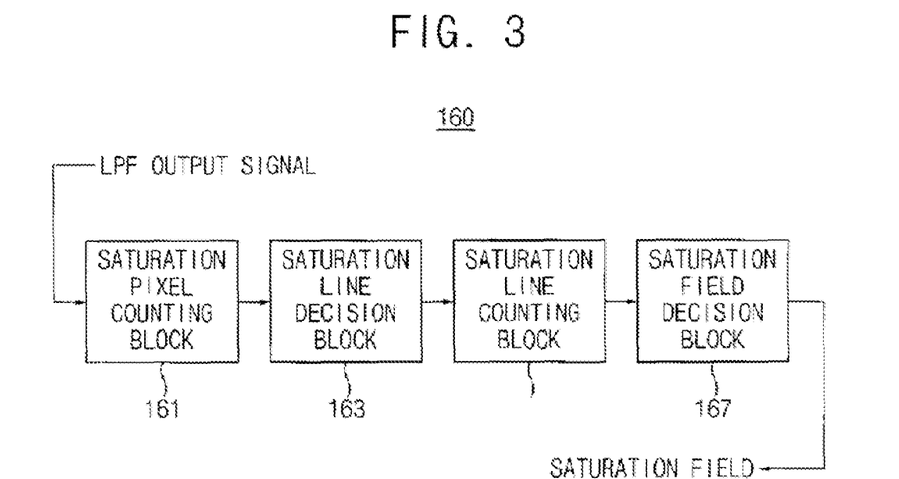
FIG. 3 is a schematic block diagram illustrating the structure of a saturation field detecting block according to an exemplary embodiment of the present invention.

FIG. 3 is a schematic block diagram illustrating the structure of a saturation field detecting block 160 shown in FIG. 1 according to an exemplary embodiment of the present invention.

Referring to FIG. 3, the saturation field detecting block 160 includes a saturation pixel counting block 161, a saturation line decision block 163, a saturation line counting block 165, and a saturation field decision block 167.

The saturation pixel counting block 161 receives the digital image signal that does not include the color signal. In an exemplary embodiment, a digital code of pixels included in the digital image signal may range from 0 to 255, when the digital image signal includes 8-bit data. The saturation pixel counting block 161 has a first reference value that is predetermined. The saturation pixel counting block 161 compares the first reference value with the digital code of every pixel included in the digital image signal, which does not include the color signal. In an exemplary embodiment, the first reference value may be set as a value ranging from about 80% to about 90% of the top level value of the ADC 130. When the digital code of a pixel exceeds the first reference value, the pixel is determined as a saturated pixel. In an exemplary embodiment, in case of an ADC of 8-bit resolution, the first reference value may be set to 240. In which case, a pixel having digital code ranging from about 241 to about 255 is determined as a saturated pixel. The saturated pixels are counted in every scan line. That is, the saturation pixel counting block 161 counts the number of saturated pixels that have the digital code exceeding the first reference value.

The saturation line decision block 163 receives the number of saturated pixels from the saturation pixel counting block 161. The saturation line decision block 163 has a second reference value that is predetermined. The saturation line decision block 163 compares the number of saturated pixels with the second reference value. In an exemplary embodiment, the second reference value may range from about 25% to about 30% of the number of pixels constituting one scan line. When the number of saturated pixels in one scan line exceeds the second reference number, the scan line is determined as a saturated scan line. In an exemplary embodiment, when the number of pixels constituting one scan line corresponds to 858, the second reference value may be set to 286. Then, the second reference value which, in this case is 286, is compared with the number of saturated pixels. When the number of saturated pixels exceeds 286, the scan line is determined as a saturated scan line. That is, the saturated scan line includes a plurality of pixels having digital codes around the top level of the ADC 130. The saturated scan line has a high possibility of becoming a saturated image.

The saturation line counting block 165 counts the number of saturated scan lines in every field that is determined in the saturation line counting block 163.

The saturation field decision block 167 receives the number of saturation lines from the saturation line counting block 165. The saturation field decision block 167 has a third reference value that is predetermined. In an exemplary embodiment, the third reference value may be set as a value ranging from about 25% to about 30% of the total number of the scan lines constituting one field. A field that has a total number of saturated scan lines exceeding the third reference value is determined to be a saturated field. For example, in case of the National Television System Committee (NTSC) interlaced scan method, a field includes 262.5 scan lines and the third reference value may be set to 80. A field that has the number of the saturated scan lines exceeding 80 is determined as a saturated field. Whenever the saturated field occurs, the saturation field decision block 167 provides an output signal to the gain control block 170 according to the detection of the saturated field.

Figure 4:
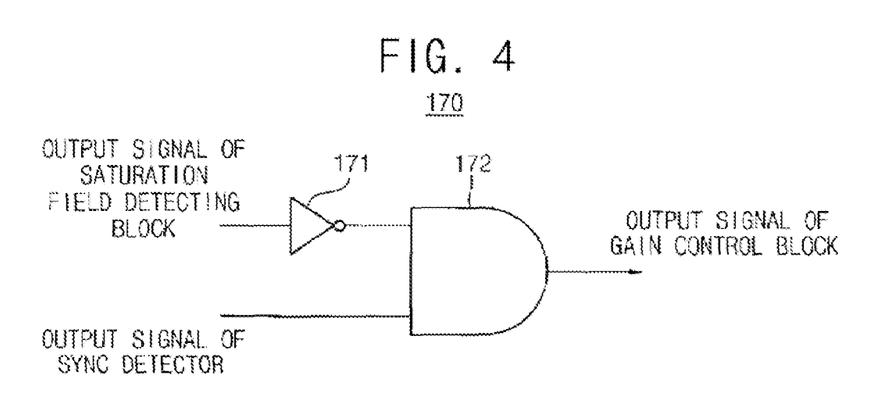
FIG. 4 is a schematic block diagram illustrating the structure of a gain control block.

FIG. 4 is a schematic block diagram illustrating the structure of the gain control block 170 shown in FIG. 1.

As shown in FIG. 4, the gain control block 170 may be implemented with an inverter 171 and an AND gate 172. Referring to FIG. 4, the gain control block 170 simultaneously receives the output of the sync detector 150 and the output of the saturation field detecting block 160. In an exemplary embodiment, the saturation field detecting block 160 may output logic 'high' when the current field is a saturated field, and may output logic 'low' when the current field is not a saturated field.

When the output signal of the saturation field detecting block 160 corresponds to logic 'low,' the output signal of the gain control block 170 depends on the output signal of the sync detector 150. Accordingly, the AGC 120 may increase or decrease the amplitude of the input analog image signal in response to the output signal of the gain control block 170.

On the contrary, when the output of the saturation field detecting block 160 corresponds to logic 'high,' the current field is a saturated field. In this case, the output signal of the gain control block 170 corresponds to logic 'low' regardless of the output signal of the sync detector 150. Therefore, the AGC 120 reduces the amplitude of the analog input image signal in response to the output signal of the gain control block 170. If a field is determined as a saturated field, the amplitude of the analog input image signal is controlled by the output signal of the sync detector 150.

Accordingly, the gain control circuit 100 of FIG. 1 may secure a dynamic range of the ADC 130 by controlling the gain of the AGC 120 per scan line through the sync detector 150, and may prevent loss of image information by controlling the gain of the ADC 130 per field through the saturation field detecting block 160.

Figure 5:
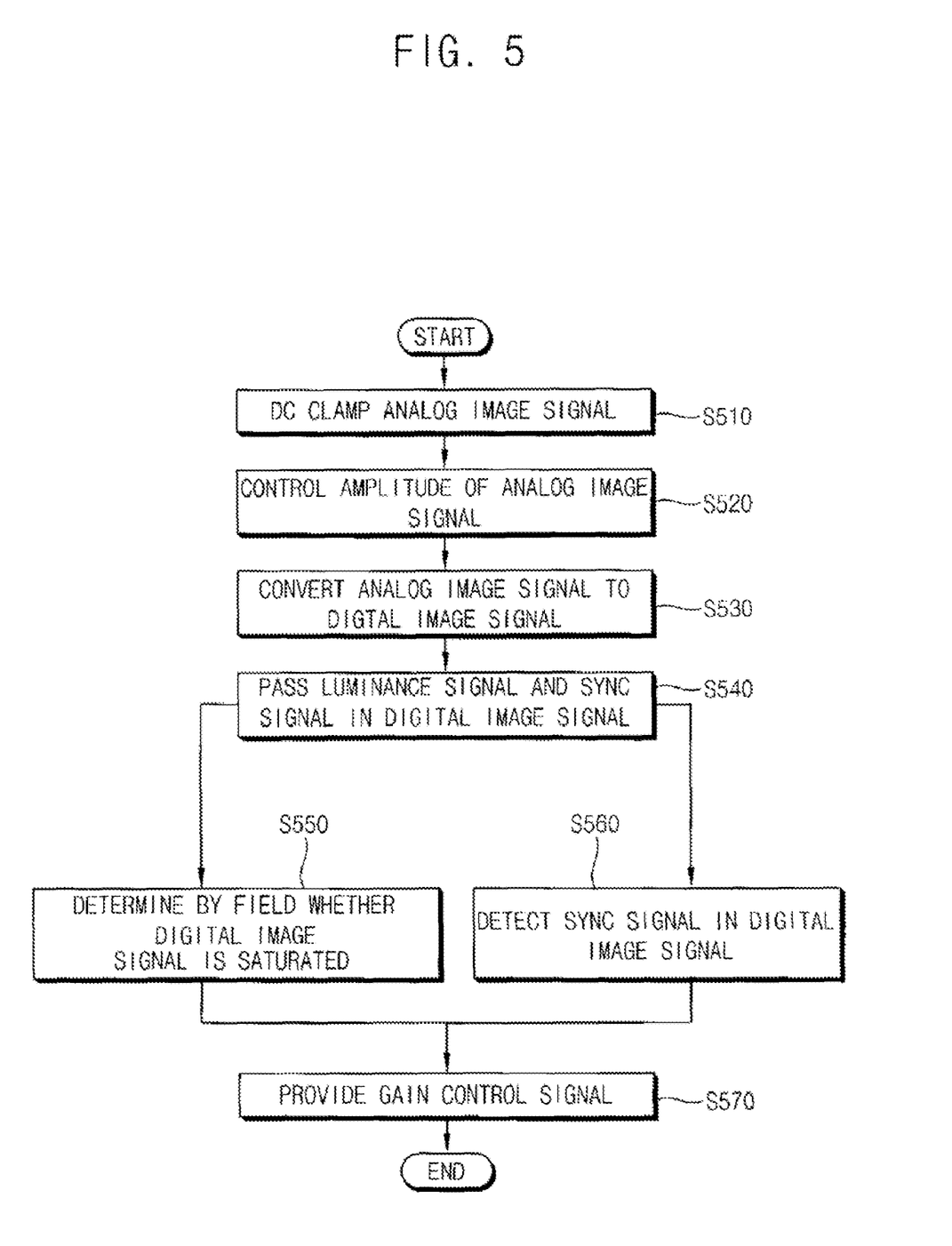
FIG. 5 is a flow chart illustrating a method of controlling gain according to an exemplary embodiment of the present invention.

FIG. 5 is a flow chart illustrating a method of controlling gain according to an exemplary embodiment of the present invention.

Referring to FIG. 5, the method of controlling gain includes controlling amplitude of an analog image signal including a luminance signal, a color signal and a sync signal (step S520), converting the amplitude-controlled analog image signal to a digital image signal (step S530), determining on a per field basis whether the digital image signal is saturated (step S550), detecting the sync signal in the digital image signal (step S560) and providing a gain control signal that controls the amplitude of the analog image signal based on the detected sync signal and the saturated field that is determined (step S570).

The method of controlling gain may further include initially fixing a DC component of the analog image signal (step S510) and passing, that is, filtering, the luminance signal and the sync signal in the digital image signal (step S540).

Figure 6:
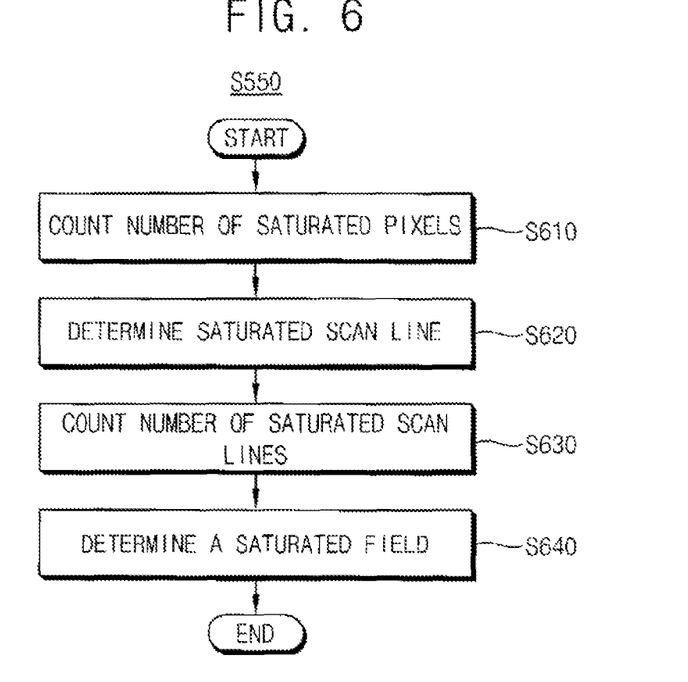
FIG. 6 is a detailed flow chart illustrating a step of determining on a per field basis whether the digital image signal is saturated.

FIG. 6 is a detailed flow chart illustrating the step of determining on a per field basis whether the digital image signal is saturated (step S550), as shown in FIG. 5.

Referring to FIG. 6, step S550 includes counting the number of saturated pixels by scan line (step S610), determining a saturated scan line based on the number of saturated pixels that is counted (step S620), counting the number of saturated scan lines (step S630) and determining a saturated field based on the number of saturated scan lines that is counted (step S640).

Figure 7:
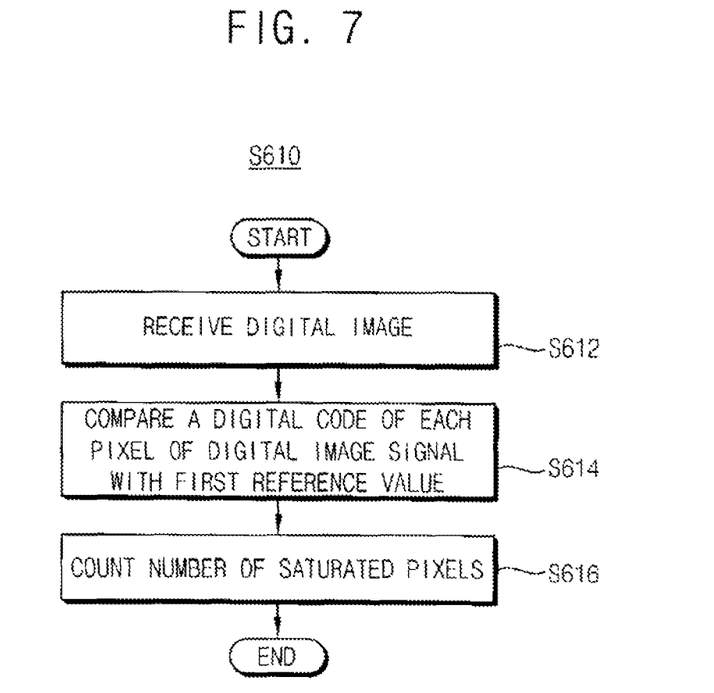
FIG. 7 is a detailed flow chart illustrating a step of counting the number of saturated pixels.

FIG. 7 is a detailed flow chart illustrating the step of counting the number of saturated pixels (step S610), as shown in FIG. 6.

Referring to FIG. 7, step S610 includes receiving the digital image signal including the luminance signal and the sync signal (step S612), comparing a digital code of each pixel of the digital image signal with a predetermined first reference value (step S614) and counting by scan line the saturated pixels having the digital code exceeding the first reference value (step S616). In an exemplary embodiment, a digital code of pixels included in the digital image signal may range from 0 to 255, when the digital image signal includes 8-bit data. In this case, the first reference value may be set as 240. Then, a pixel having a digital code ranging from about 241 to about 255 is determined as a saturated pixel. The saturated pixels are counted in every scan line.

Figure 8:
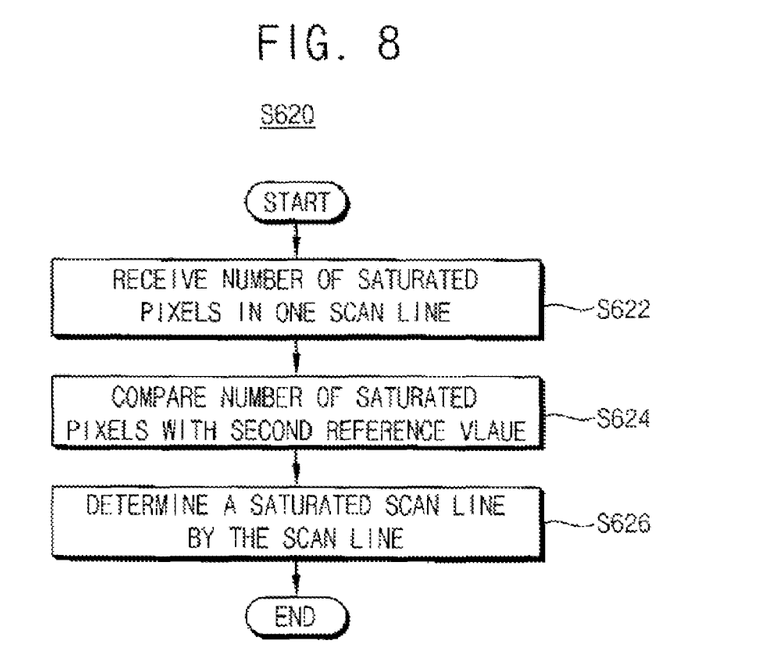
FIG. 8 is a detailed flow chart illustrating a step of determining a saturated scan line based on the number of saturated pixels.

FIG. 8 is a detailed flow chart illustrating the step of determining the saturated scan line based on the number of saturated pixels (step S620), as shown in FIG. 6.

Referring to FIG. 8, step S620 includes receiving the number of saturated pixels that is counted (step S622), comparing the number of saturated pixels with a predetermined second reference value (step S624) and determining by scan line the saturated scan line based on the comparison result (step S626). In an exemplary embodiment, when the total number of pixels constituting one scan line may correspond to 858, the predetermined second reference value may correspond to 286. Then the second reference value (in this case, 286) is compared with the total number of saturated pixels in one scan line. When the total number of saturated pixels exceeds 286, the current scan line is determined as a saturated scan line.

The number of saturated scan lines is counted in step S630.

Figure 9:
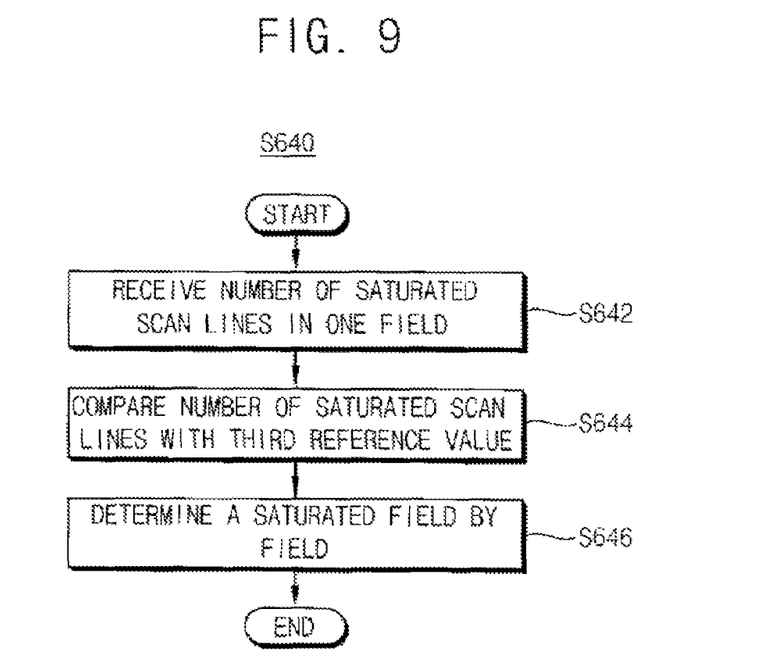
FIG. 9 is a detailed flow chart illustrating a step of determining a saturated field.

FIG. 9 is a detailed flow chart illustrating the step of determining the saturated field (step S640), as shown in FIG. 6.

Referring to FIG. 9, step S640 includes receiving the number of saturated scan lines in one field (step S642), comparing the number of saturated scan lines with a predetermined third reference value (step S644) and determining on a per field basis the saturated field based on the comparison result (step S646). In case of the NTSC interlaced scan method, one field includes 262.5 scan lines. Then, the predetermined third reference value may be set as 80. In case of the progressive scan method, one field includes 525 scan lines. Then, the predetermined third reference value may be set as 160. The predetermined third reference value is compared with the total number of the saturated scan lines in one field. In case of the NTSC interlaced scan method, a field that has the total number of scan lines exceeding 80 is determined as a saturated field. When the saturated field is determined, the gain control signal for reducing the amplitude of the analog image signal is provided. Then, the amplitude of the analog image signal is reduced in step S520, and the saturation of the analog image signal may not occur. Then the amplitude of the analog image signal is controlled (step S570) based on the result obtained in step S560.

In the described exemplary embodiments of the present invention, the gain control circuit and the method of controlling gain determine on a per field basis whether a field is saturated, and may prevent saturation of the analog image signal to prevent loss of image information by controlling the gain of the analog image signal.

The gain control circuit and the method of controlling gain according to exemplary embodiments of the present invention may be applied not only to the NTSC interlaced scan method but also to other kinds of interlaced scan methods.

While the exemplary embodiments of the present invention and their advantages have been described in detail, it should be understood that various changes, substitutions and alterations may be made herein without departing from the scope of the invention.

What is claimed is:

1. A gain control circuit comprising:
   an automatic gain controller (AGC) configured to control amplitude of an analog image signal that includes a luminance signal, a color signal and a sync signal;
   an analog-to-digital converter (ADC) configured to convert the amplitude-controlled analog image signal to a digital image signal;
   a saturation field detecting block configured to determine on a per field basis whether the digital image signal is saturated;
   a sync detector configured to detect the sync signal in the digital image signal; and
   a gain control block configured to provide a gain control signal to the AGC based on an output signal of the saturation field detecting block and an output signal of the sync detector, wherein the saturation field detecting block comprises:
   a saturation pixel counting block configured to count saturated pixels per scan line;
   a saturation line decision block configured to determine whether each scan line is saturated based on the number of saturated pixels that is counted per scan lines;
   a saturation line counting block configured to count the number of saturated scan lines per field; and
   a saturation field decision block configured to determine whether each field is saturated based on the number of saturated scan lines that is counted per field.

2. The gain control circuit of claim 1, further comprising:
a direct current (DC) clamp that fixes a DC component of the analog image signal; and
a low-pass filter (LPF) that filters out the color signal and passes the luminance signal and the sync signal in the digital image signal.

3. The gain control circuit of claim 1, wherein the saturation pixel counting block determines that a pixel is a saturated pixel when a digital code of the pixel exceeds a first reference value.

4. The gain control circuit of claim 3, wherein the first reference value is set to a value ranging from about 80% to about 90% of a maximum digital code of the pixel.

5. The gain control circuit of claim 1, wherein the saturation line decision block determines that a scan line is a saturated scan line when total number of saturated pixels in the scan line exceeds a second reference value.

6. The gain control circuit of claim 5, wherein the second reference value is set to a value ranging from about 25% to about 30% of a number of pixels constituting one scan line.

7. The gain control circuit of claim 1 wherein the saturation field decision block determines that a field is a saturated field when a total number of saturated scan lines in the field exceeds a third reference value.

8. The gain control circuit of claim 7, wherein the third reference value is set to a value ranging from about 25% to about 30% of a total number of the scan lines constituting one field.

9. The gain control circuit of claim 1, wherein the gain control block provides the gain control signal for reducing the amplitude of the analog image signal to the AGC when the saturation field is detected and provides the gain control signal for controlling the amplitude of the analog image signal based on the output signal of the sync detector to the AGC when a saturation field is not detected.

10. A method of controlling gain comprising:
controlling amplitude of an analog image signal that includes a luminance signal, a color signal, and a sync signal;
converting the amplitude-controlled analog image signal to a digital image signal;
determining on a per field basis whether the digital image signal is saturated;
detecting the sync signal in the digital image signal; and
providing a gain control signal that controls the amplitude of the analog image signal based on the detected sync signal and the saturated field that is determined, wherein determining on a per field basis whether the digital image signal is saturated comprises:
counting the number of saturated pixels per scan line;
determining whether each scan line is saturated based on the number of saturated pixels that is counted per scan line;
counting the number of saturated scan lines per field; and
determining whether each field is saturated based on the number of saturated scan lines that is counted per field.

11. The method of claim 10, further comprising:
fixing a DC component of the analog image signal; and
filtering out the color signal and passing the luminance signal and the sync signal in the digital image signal.

12. The method of claim 10, wherein counting the number of the saturated pixels comprises:
receiving the digital image signal including the luminance signal and the sync signal;
determining that a pixel is a saturated pixel when a digital code of the pixel exceeds a first reference value; and
counting per scan line the number of saturated pixels having the digital code exceeding the first reference value.

13. The method of claim 12, wherein the first reference value is set to a value ranging from about 80% to about 90% of a maximum digital code of the pixel.

14. The method of claim 13, wherein the number of saturated pixels increases by one whenever the digital code of the pixels exceeds the first reference value.

15. The method of claim 10, wherein determining whether each scan line is saturated comprises:
receiving the number of saturated pixels that is counted;
comparing the number of saturated pixels with a second reference value; and
determining that a scan line is a saturated scan line when a total number of saturated pixels in the scan line exceeds the second reference value.

16. The method of claim 15, wherein the second reference value is set to a value ranging from about 25% to about 30% of a number of pixels constituting one scan line.

17. The method of claim 16, wherein the number of saturated scan lines increases by one, whenever the number of saturated pixels in one scan line exceeds the second reference value.

18. The method of claim 10, wherein determining whether each field is saturated comprises:
receiving the number of saturated scan lines in one field;
comparing the number of saturated scan lines with a third reference value; and
determining a field as a saturated field when a total number of saturated scan lines in the field exceeds the third reference value.

19. The method of claim 18, wherein the third reference value is set to a value ranging from about 25% to about 30% of a total number of the scan lines constituting one field.

20. The method of claim 19, wherein the third reference value corresponds to 80 in case of the NTSC interlaced scan method and corresponds to 160 in case of the progressive scan method.

21. The method of claim 10, wherein the amplitude of the analog image signal is controlled based on the detected sync signal when the saturated field is not detected.

22. The method of claim 10, wherein the amplitude of the analog image signal is reduced when the saturated field is detected.

* * * * *